May 28, 1946. H. J. DORGELYS 2,401,057
CROWN FASTENER
Filed Jan. 9, 1946
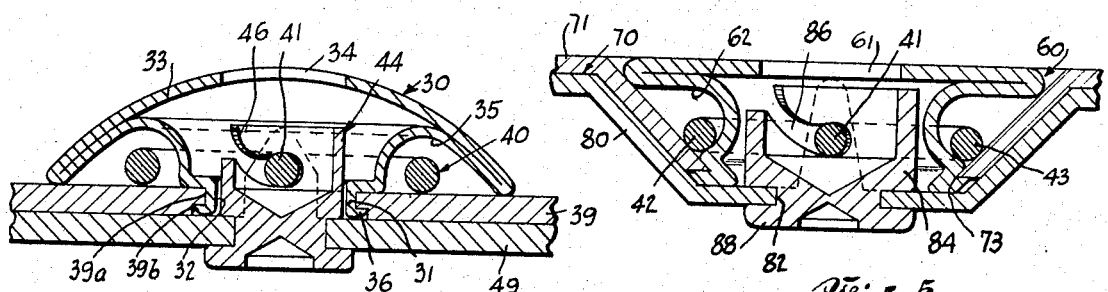
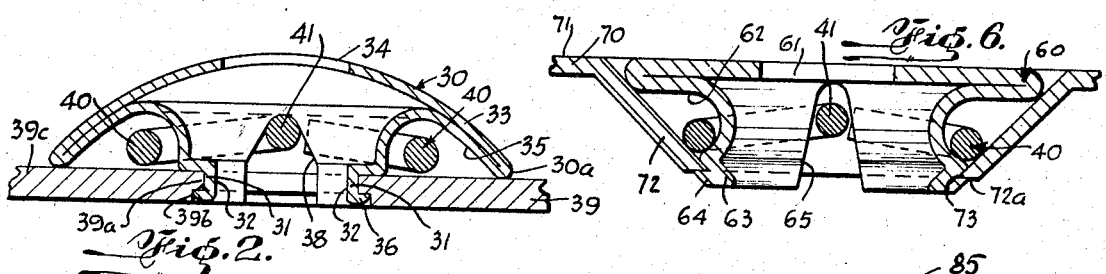
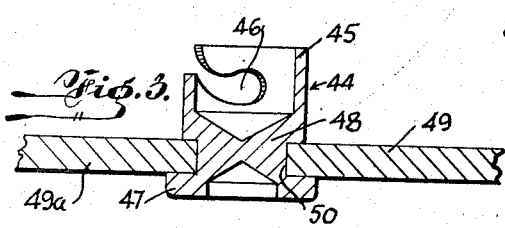
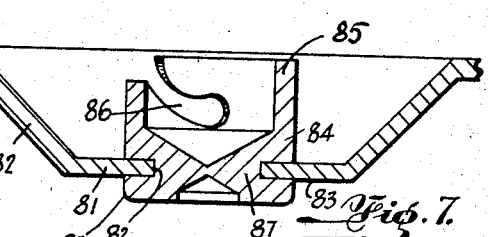
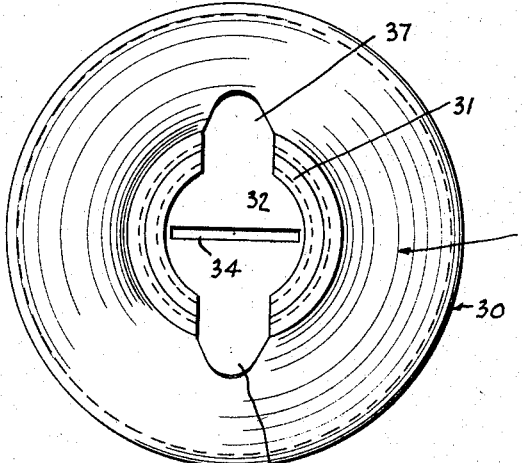
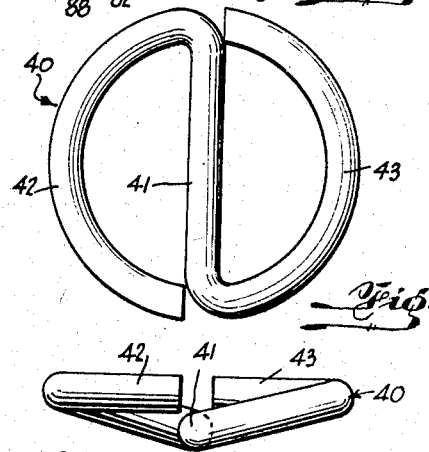
INVENTOR.
HENRI J. DORGELYS
BY
Leon M. Strauss
AGT.

Patented May 28, 1946

2,401,057

UNITED STATES PATENT OFFICE 2,401,057

CROWN FASTENER

Henri J. Dorgelys, Hempstead, N. Y.

Application January 9, 1946, Serial No. 639,951

6 Claims. (Cl. 24—221)

This invention relates to fastener means of the rivetless type and more particularly to detachable fastener devices for joining together parts, such as metal sheets, plates and the like. This application is a continuation-in-part of my copending application Serial No. 503,936, filed Sept. 27, 1943.

It is one of the objects of this invention to provide fastener means of the aforesaid type which may be utilized in many branches of the industry, which fastener means are sturdy in construction, simple in manipulation, easy and economical to manufacture and very efficient in operation, requiring only conventional tools therefor.

It is another object of this invention to provide a fastener device of the aforesaid nature having the particular feature that its head or crown only may be disengaged or detached from the remainder of the fastener device, while the joint or assembly to which the fastener device is applied, remains still in operative position.

It is a further object of this invention to provide fastener means having complementary parts or elements, which may be securely and rapidly brought into engagement with one another and which may also be separated from each other in a very convenient and simple manner.

It is still a further object of this invention to provide fastener means having complementary, engageable elements which may be either fixedly or movably attached to a respective surface of the parts to be joined together or may be set in or countersunk in such parts without being subjected to any substantial change in regard to the design and structure of the fastener means.

Yet, another object of this invention is to provide fastener means which may comprise but a few elements, some of which being formed from sheet material and therefore readily fit for mass production.

These and other objects and advantages will follow from the ensuing specification and attached drawing illustrating practical embodiments of the invention.

In the drawing:

Fig. 1 is a cross sectional view of the fastener device made in accordance with this invention, shown in operative position and with two locking members of said device attached respectively, to plate parts.

Fig. 2 is a cross-sectional view of the cap-shaped head member forming one of the locking members, which is attached to one of the plate parts.

Fig. 3 is a cross-sectional view of the stud member forming the other of said locking members, which is attached to the other of said plate parts.

Fig. 4 is a bottom plan view of the cap-shaped head member made in accordance with this invention.

Fig. 5 is a cross-sectional view of a modified fastener device made in accordance with this invention, shown in operative position, the locking members of the device being shown attached respectively, to dish-shaped plate parts.

Fig. 6 is a cross-sectional view of the head member as seen in Fig. 5 and connected to one of the plate parts.

Fig. 7 is a cross-sectional view of the stud member as seen in Fig. 5 and applied to another plate part.

Fig. 8 is a plan view of a spring element, depicted on an enlarged scale, as employed in connection with this invention.

Fig. 9 is an end view of the spring element of Fig. 8.

Referring now to the drawing and more particularly to Figs. 1 to 4 inclusive, there is disclosed a crown member 30 having a sleeve portion 31 with a central opening or passageway 32, a curved top portion 33 provided with a tool slot 34 and an annular groove or recess 35 extending at the underface of curved portion 33 between sleeve member 31 and said underface of top portion 33. Sleeve 31 terminates into bottom portion or flange 36.

Head member 30 is further provided with lateral cutouts 37, 38 for a purpose later described. Head member 30 carries in recess 35 a spring element 40 which is held in position in said recess between portion 33 and plate part 39. Head member 30 is rotatably secured on plate part 39. To this end, plate part 39 is provided with a perforation 39a which is enlarged at 39b. Sleeve member 31 may be inserted in said perforation 39a and the flange or bottom portion 36 of sleeve 31 may be rolled over or otherwise brought into engagement with enlarged perforation 39b.

It is well understood that instead of flat bottom portion or flange 36 any other suitable means integral with the locking member, such as a ferrule, eyelet or other similar retainer means may be employed to rotatably secure head or locking member 30 on plate part 39.

Lateral end 30a of curved portion 33 comes to rest on surface 39c of plate part 39. Spring element 40 (Figs. 8 and 9) has the intermediate or central portion 41 which is offset or raised above the plane of the spring legs 42, 43, as can be realized from Fig. 9.

Upon insertion of spring element 40 into groove 35 of crown member 30 (as will be realized from Fig. 2) the central portion 41 is held within cut-outs 37 and 38 and extends across central passageway 32. Portion 41 is accessible through tool slot 34 from the outer surface of crown member 30.

Fig. 3 illustrates in cross-section the other locking member 44 having a forward or projecting end 45 with a slot, preferably a bayonet slot 46, while the opposite end 47 forming a shoulder, is fixedly secured on the other plate part 49 by first inserting extension 48 of stud 44 in plate perforation 50 and subsequently riveting said extension 48 at surface 49a of plate part 49 to bring about the riveted flange or shoulder 47.

As may be realized from Fig. 1, the fastener device is shown in operative position with its plate parts 39 and 49 in assembled condition. The fastener device made in accordance with this invention principally consists of two locking members, namely head member 30 including spring 40 and stud member 44 with bayonet slot 46.

In order to bring about the aforesaid operative position all that is to be done is that the offset portion 41 of spring element 40 is pushed downwardly by means of any conventional tool (not shown) which will be inserted through tool slot 34 for the engagement position with bayonet slot 46, which engagement may be further facilitated by turning head member 30 relatively to stud member 44 thereby causing exertion of spring tension of offset spring portion 41 within bayonet slot 46 and tight engagement of plates 39 and 49 in assembled condition.

It may be further realized that in this condition the end 45 of stud member 44 projects into passageway 32 and is concealed from view by the outer surface 33 of head member 30.

In order to effectuate disassembly of plate part 39 from plate part 49, the aforesaid tool may be again inserted in slot 34 until it engages spring portion 41. Upon rotation of head member 30 spring portion 41 disengages then bayonet slot 46 and plate part 39 may be subsequently removed together with head or crown member 30 from plate part 49 carrying said stud 44.

As illustrated in Figs. 5 to 7 inclusive, the outer surface of the head member 60 is arranged flush with the outer surface 71 of the plate part 70 with which the head member 60 of the fastener device may be united.

In Fig. 6 there is shown the plate part 70 provided with an inwardly dished bottom portion 72 having the perforation or opening 73. Retained in said perforation 73 is locking or head member 60. This head member 60 is provided with a tool slot 61, has a constricted neck portion forming the annular recess 62, which, in turn, terminates into the bevelled or flanged portion 63 integral with head 60.

Beveled portion 63 is so constructed that when head member 60 is brought into engagement position with plate part 70, the forward end or flange 64 of said beveled portion comes to lie outside opening 73 and in contact with the end wall 72a of dished bottom portion 72.

The shape of member 60 is such that it fits into the contour of the dished plate part 70—72. As will be further seen from Fig. 6, spring 40 is inserted in annular recess 62 and extends with its offset middle portion 41 only across cut-outs 65 whose function corresponds to that of the aforesaid cut-outs 37, 38 (Figs. 2 and 4).

Plate part 80 to be brought into engagement with plate part 70, is likewise provided with a dished bottom 82 which terminates into a flat plate portion 81 having a central perforation 82.

Stud member 84 forming the other locking member of the fastener device similarly to stud member 44 (Fig. 3), is provided with a forward end 85 having the bayonet slot 86. Passing through perforation 82 is an extension 87 which may be riveted or otherwise attached in a suitable manner to the underface 83 of plate portion 81 so as to form rivet head 88.

In order to bring plate 70 into tight engagement with plate 80, as exemplified in Fig. 5, stud member 84 is inserted in the hollow head or crown member 60 and the spring portion 41 is brought into engagement with slot 86, as hereinabove explained with respect to spring portion 41 and bayonet slot 46 with reference to Fig. 1.

It is to be observed that shape and contour of the head or crown member may be varied and changed at will. It is, however, preferable to choose a crown member, such as shown in Figs. 2 and 6, which may lend itself to the application on parts or plates with straight, as well as with countersunk surfaces. The crown member may be made from any material suitable for the purpose and for mass production, such as sheet metal, plastic or plastic composition material and the like. The crown member may be made with or without tool slot and may be provided with wings instead of a tool slot.

It can thus be seen that there has been provided in accordance with this invention a detachable or separable fastener device of the kind described for connecting parts, preferably plate parts, together under spring action, which fastener device comprises two locking members adapted for engagement with one another; one of said members being fixedly secured to one of said parts and carrying at its forward end a bayonet slot, the other of said locking members being rotatably connected with the other of said parts and provided with a central passageway for receiving said forward end of said one locking member therein, a spring element held by said other member and having an intermediate portion traversing said passageway, said intermediate spring portion being positioned between said other member and said other part, flange means on said other locking member and rotatably connecting the latter with said other part, whereby upon rotation of said other locking member relatively to said forward end of said one locking member said intermediate spring portion may be brought into engagement with said bayonet slot to thereby urge said parts together in assembled condition, while said forward end of said one member projects into said central passageway and is concealed from view by said other member, and means provided in the surface of said other member to facilitate rotation thereof.

As many possible embodiments may be made of the above invention, and as many changes might be made in the embodiments above set forth, it is to be understood that all matters hereinbefore disclosed or shown in the accompanying drawing are to be interpreted as illustrative and not in a limiting sense.

Having thus described the invention, what is claimed as new and desired to be secured by Letters Patent, is:

1. A detachable fastener device for connecting parts together under spring action comprising two members, one of said members forming a stud fixedly secured with one of its ends to one of said parts and carrying at the other end a bayonet slot, the other of said members being provided with a recess and having a central passageway, said other member being connected with the other of said parts for rotation thereon, a spring element disposed within said recess of said other member and including a portion extending across said central passageway, and means rotatably connecting said other member with said other part, whereby upon rotation of said other member relatively to said stud, said portion of said spring element may be brought into engagement with said bayonet slot, whereby said parts are urged together in assembled condition, while said stud projects into said passageway.

2. A detachable fastener device for connecting parts together under spring action comprising two members, one of said members forming a stud fixedly secured with one of its ends to one of said parts and carrying at its other end a bayonet slot, the other of said members being connected with the other of said parts for rotation thereon and forming a cap, said cap being provided with a peripheral recess and with a central opening, a spring element nested in said recess of said cap and including a portion extending across said central opening, and flange means on said cap engaging said other part and rotatably connecting said cap with said other part, whereby upon rotation of said cap relatively to said stud said portion of said spring element may be brought ino engagement with said bayonet slot, whereby said parts are urged together in assembled condition, while said stud is received in said central opening of said cap.

3. A detachable fastener device for connecting parts together under spring action comprising two engageable members, one of said members forming a stud fixedly secured with one of its ends to one of said parts and carrying at its opposite end a bayonet slot, the other of said members being rotatably connected with the other of said parts and forming a cap-shaped head, said cap-shaped head being hollow and being provided with a peripheral recess and a central opening, a spring element seated in said recess and traversing said central opening, said spring element being positioned substantially intermediate the outer surface of said head and said other part, and means rotatably connecting said head with said other part, whereby upon rotation of said head relatively to said stud the portion of said spring element traversing said central opening may be brought into engagement with said bayonet slot, to thereby urge said parts together in assembled condition, while said stud projects into said central opening of said hollow head.

4. A detachable fastener device for connecting parts together under spring action comprising two locking members adapted for engagement with one another, one of said members being secured to one of said parts and carrying a bayonet slot at its forward end, the other of said members being rotatably connected with the other of said parts and being provided with a central opening for receiving said forward end therein, a spring element seated adjacent said opening and having an intermediate portion traversing the same and being positioned substantially between the outer surface of said other member and said other part, means integral with said other member and rotatably connecting the same with said other part, whereby upon rotation of said other member relatively to said forward end of said one member said spring element within said opening will engage said bayonet slot, to thereby urge said parts together in assembled condition, while said forward end projects into said central opening and is concealed from view by said outer surface of said other member.

5. A detachable fastener device for connecting parts together in superposed position and under spring action comprising two members, one of said members being fixedly secured to one of said parts and carrying at its forward end an engageable element, the other of said members being provided with a central passageway and being connected with said other part for rotation thereon, a spring element held in position by said other member and including a portion traversing said central passageway, and means integral with said other member and rotatably connecting said other member with said other part, whereby upon rotation of said other member relatively to said engageable element, said portion of said spring element may be brought into engagement with said element, whereby said parts are urged together in superposed position, while said forward end projects into said passageway.

6. A detachable fastener device for connecting parts together under spring action comprising two locking members adapted for engagement with one another, one of said members being secured to one of said parts and carrying at its forward end a slot, the other of said members being rotatably connected with the other of said parts and being provided with a central opening for receiving said forward end therein, a spring element seated on said other member adjacent said opening and having an intermediate portion traversing the same, said intermediate spring portion being positioned substantially between the outer surface of said other member and said other part, means integral with said other member and rotatably connecting the same with said other part, whereby upon rotation of said other member relatively to said forward end of said one member said intermediate spring portion will engage said slot, to thereby urge said parts together in assembled condition, while said forward end projects into said central opening and is concealed from view by said outer surface of said other member, and means in the outer surface of said other member to facilitate rotation thereof.

HENRI J. DORGELYS.